Figure 1:
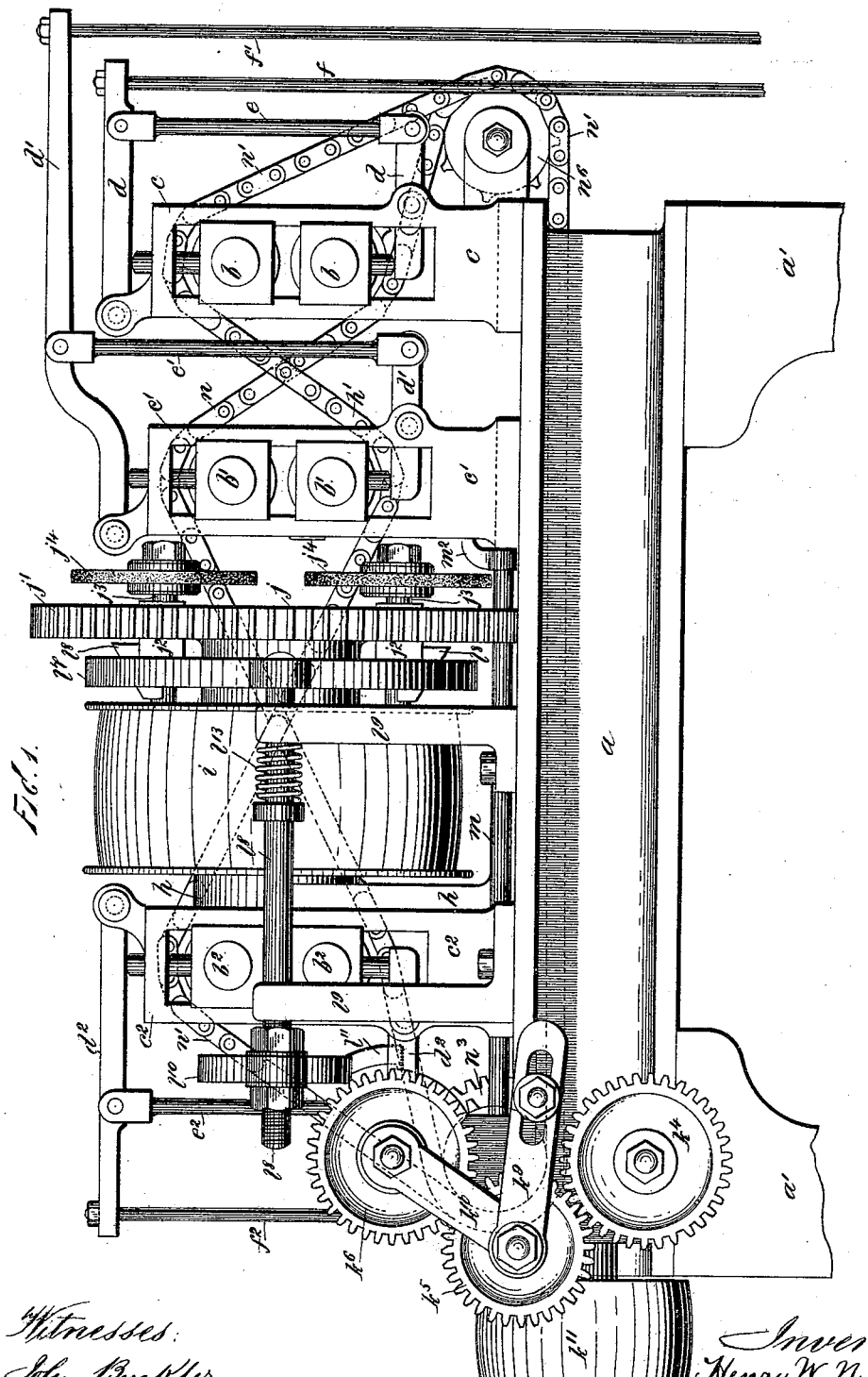

(No Model.) 6 Sheets—Sheet 1.

H. W. N. COLE.
LATHE FOR IRREGULAR SHAPES.

No. 544,288. Patented Aug. 13, 1895.

Witnesses:
John Buckler,
F. M. Eggleston.

Inventor:
Henry W. N. Cole
By Redding & Kiddle
Attorneys.

(No Model.) 6 Sheets—Sheet 2.

H. W. N. COLE.
LATHE FOR IRREGULAR SHAPES.

No. 544,288. Patented Aug. 13, 1895.

(No Model.) 6 Sheets—Sheet 3.
H. W. N. COLE.
LATHE FOR IRREGULAR SHAPES.
No. 544,288. Patented Aug. 13, 1895.

Witnesses:
Inventor:
Henry W. N. Cole
By Redding & Kiddle
Attorneys

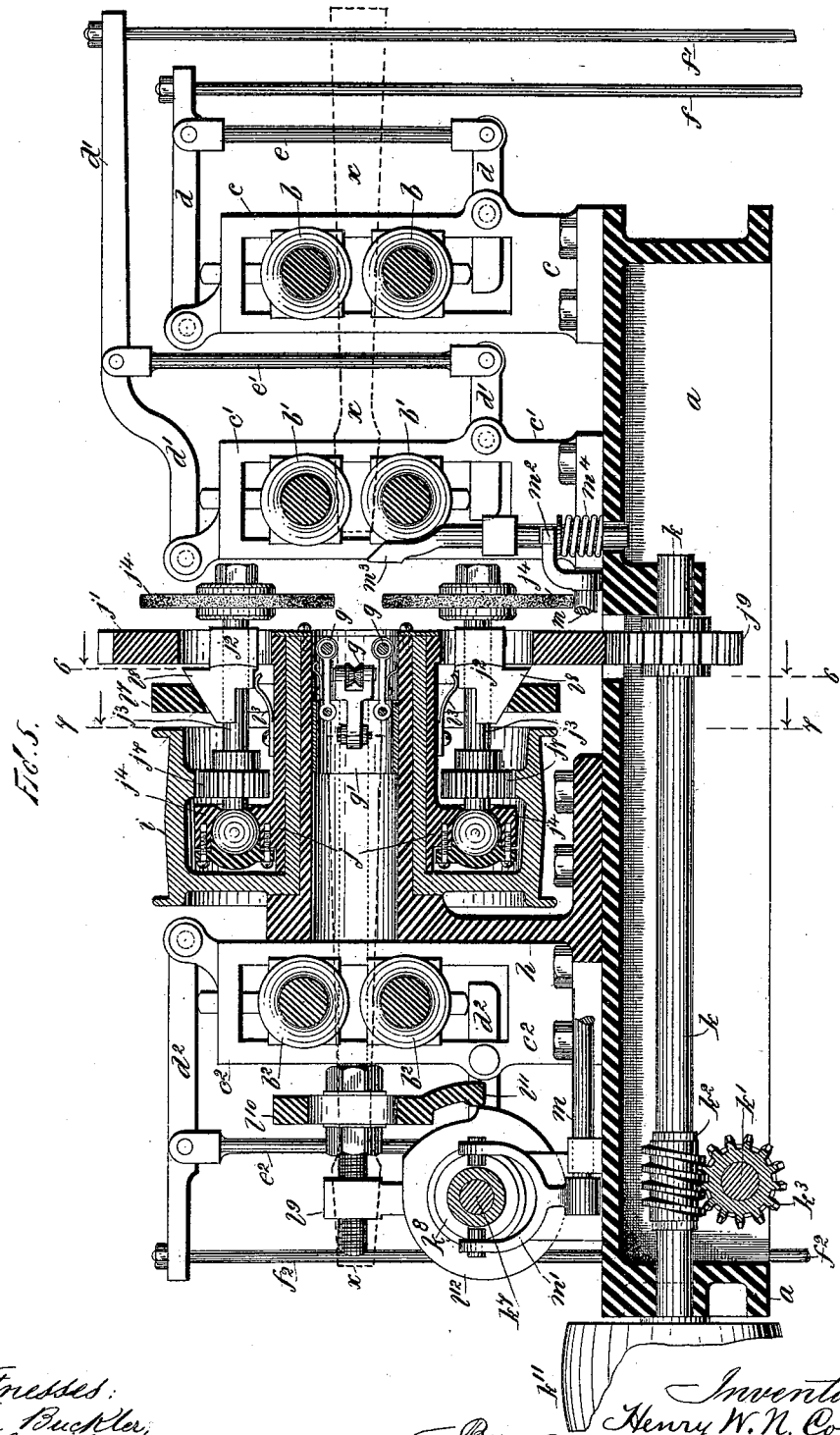

(No Model.) 6 Sheets—Sheet 5.
H. W. N. COLE.
LATHE FOR IRREGULAR SHAPES.
No. 544,288. Patented Aug. 13, 1895.
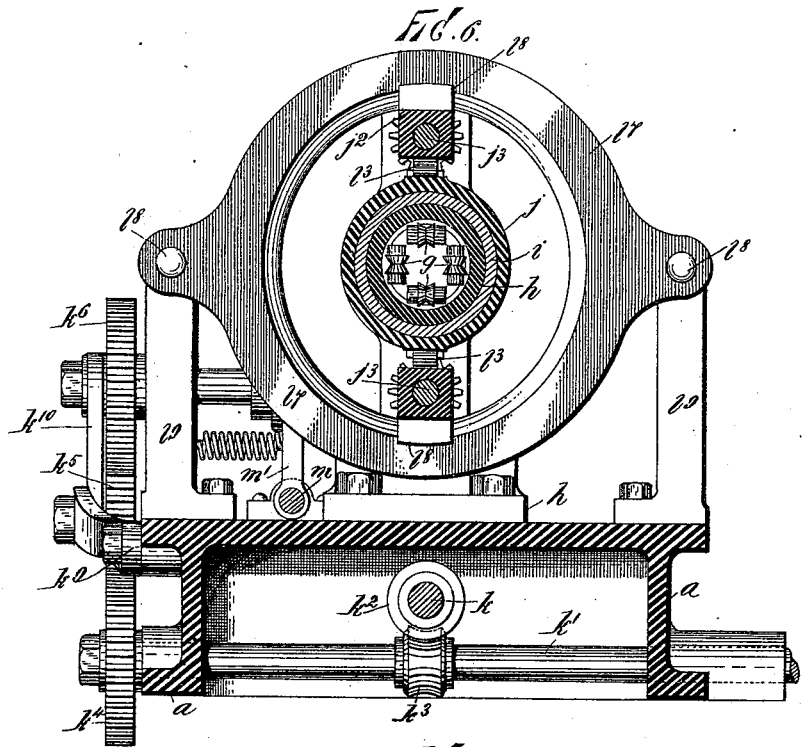

(No Model.)  6 Sheets—Sheet 6.
H. W. N. COLE.
LATHE FOR IRREGULAR SHAPES.
No. 544,288.  Patented Aug. 13, 1895.
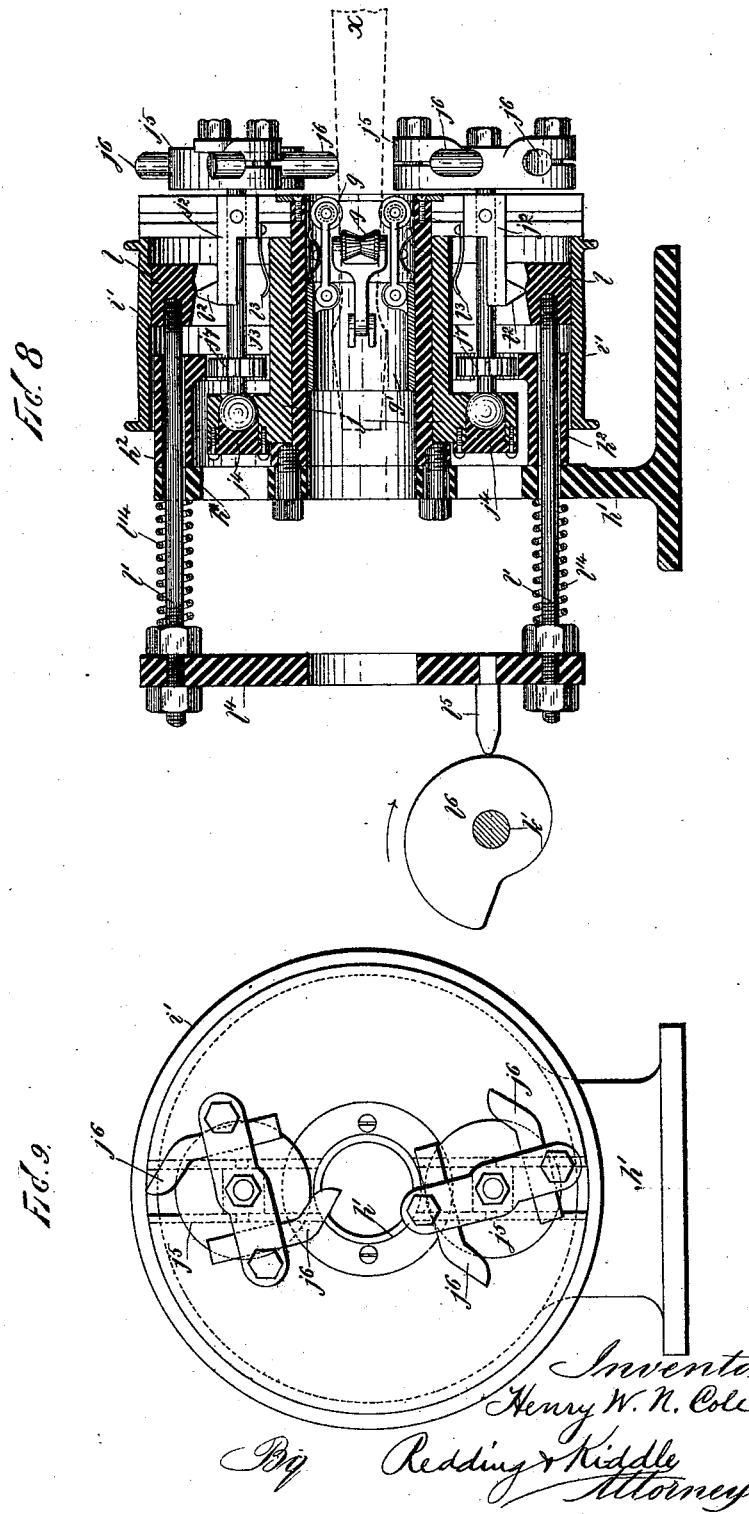

UNITED STATES PATENT OFFICE.

HENRY W. N. COLE, OF BROOKLYN, NEW YORK.

LATHE FOR IRREGULAR SHAPES.

SPECIFICATION forming part of Letters Patent No. 544,288, dated August 13, 1895.

Application filed April 23, 1894. Serial No. 508,622. (No model.)

*To all whom it may concern:*

Be it known that I, HENRY W. N. COLE, a citizen of the United States, and a resident of the city of Brooklyn, county of Kings, State of New York, have invented certain new and useful Improvements in Lathes for Irregular Shapes, of which the following is a specification, reference being had to the accompanying drawings, forming part hereof.

This invention relates to the shaping or finishing or turning of irregular shapes, and is embodied in a machine or lathe which may do the work of either cutting, grinding, or polishing or otherwise shaping or finishing the irregularly-shaped articles. In such machine or lathe the blanks or pieces of material to be shaped or the partly or wholly shaped articles are fed by rollers or other suitable feeding and guiding mechanism, so that they will be acted upon by one or more cutting-tools, grinding or polishing wheels or tools, or other shaping or finishing tools, (to be referred to hereinafter by the general designation of "tools,") which are caused to rotate upon their axes and are at the same time caused to revolve about the articles in an orbit parallel to the contour desired to be produced in the articles, so as to approach to and recede from the axis of revolution in accordance with the irregular contour of the articles. The tools are thus guided and controlled by a guide having sections or portions of different shape and of different dimensions, and as the blanks or partly-finished articles are fed under the tools different portions of this guide are caused to control the movement of the tools. Mechanism is provided for causing the movement of the guide relatively to the tool-carrying parts, such mechanism consisting, preferably, of a cam and connecting parts operating to move the guide. Mechanism is provided for starting the operation of said cam and connected parts upon the entry of a blank or partly-finished article into proper position for the tools to do their work upon the same, and for stopping the operation of said cam and connected parts after the completion of the cycle of operations upon that article, and for starting the operation of said parts when the next blank or article is inserted, and so on, whereby the same cycle of operations is repeated upon each one of the blanks or articles that are successively fed through the machine.

One of the objects of my invention is to greatly reduce the speed at which the tool carrying and guiding parts are caused to operate, so as to greatly diminish the centrifugal force or pressure exerted upon these parts, and in my improved machine the tool-carrying parts have a comparatively slow rotation and the tools are revolved about the article at a correspondingly slow speed, while the tools themselves are caused to rotate upon their axes at as high a speed as is desirable. Thus the high speed of the operating-surfaces of the tool, which is necessary in this class of machines, is accomplished with a slow speed of the tool guiding and carrying parts, and but little, if any, centrifugal pressure upon these parts.

Another object of my invention is to produce in the articles cross-sectional contours not only of different dimensions, but also of different shapes at different points throughout the length of the article, and according to my invention different portions of the same diameter may have different shapes of cross-sections or the same cross-section, as may be desired, and thus the shape of the finished article may be made up of portions of elliptical cross-section, portions of circular cross-section, and portions of any regular or irregular cross-section within the large range of variations that may be produced upon my improved machine.

I have shown in the accompanying drawings a machine designed to produce hammer-handles and embodying my invention; but it will of course be evident that with a slightly-different form of guide the machine may be adapted to the production of hatchet-handles and innumerable other articles.

Figure 2:
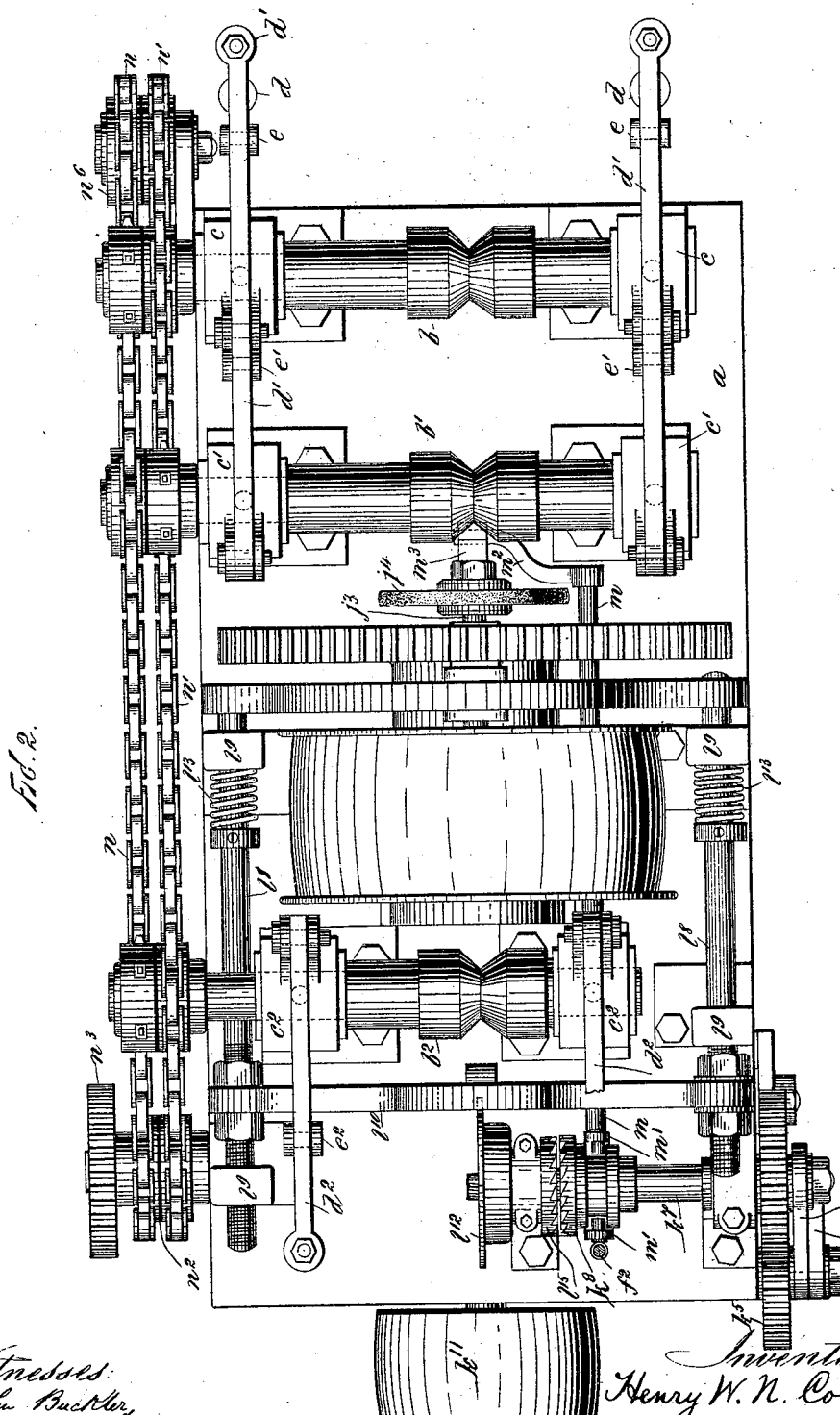
Figure 3:
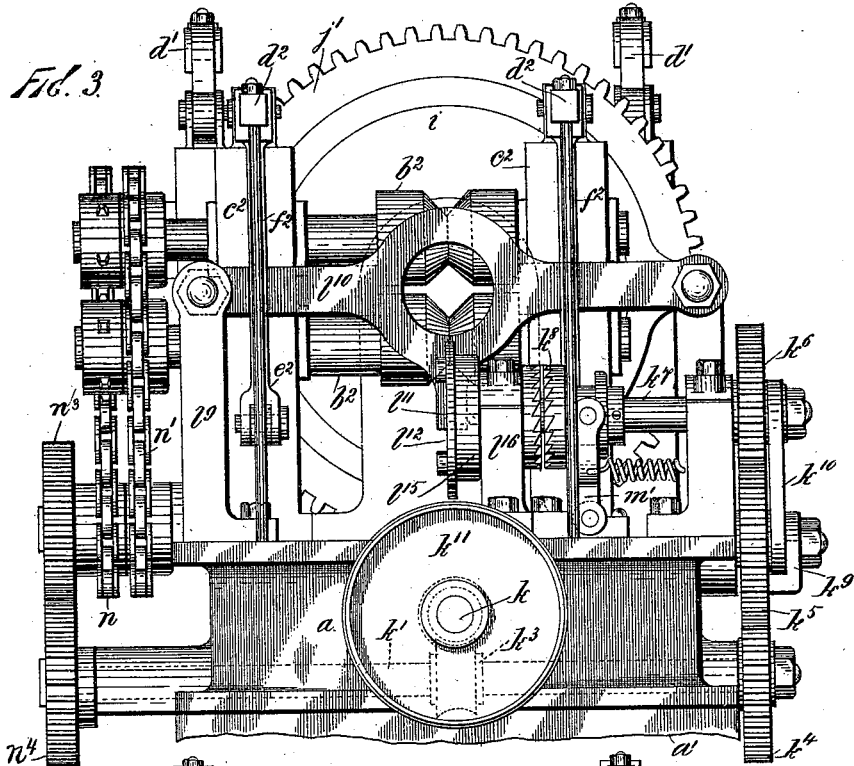
Figure 4:
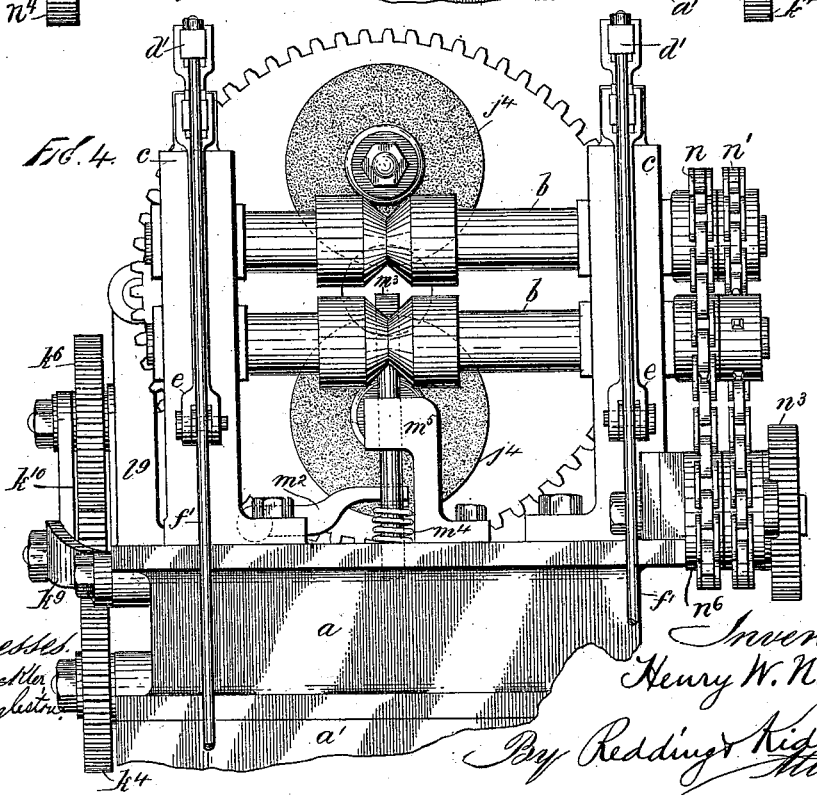

Figure 1 is a side elevation, Fig. 2 a plan view, Fig. 3 a rear end elevation, and Fig. 4 a front end elevation, of such machine. Fig. 5 is a longitudinal vertical section of the same, taken through the center of the machine. Fig. 6 is a section of the same on the line 6 6, Fig. 5; and Fig. 7 is a section of the same on the line 7 7, Fig. 5. Fig. 8 is a longitudinal vertical central section of a cutter-head and guide-operating parts, showing modifications in construction; and Fig. 9 is a front end elevation of the parts shown in Fig. 8.

The various working parts of the machine are supported by a frame, which may be of any suitable construction, and is shown as consisting of the bed-plate $a$ and supporting-legs $a'$ and various standards secured to or extending upward from said bed-plate $a$.

The feeding mechanism for the blanks or partly-finished articles is shown as comprising the three sets of V-grooved feed-rollers $b\,b$, $b'\,b'$, and $b^2\,b^2$, and these several feed-rollers are fitted to revolve in bearing-boxes which have a vertical sliding movement in the standards $c\,c$, $c'\,c'$, and $c^2\,c^2$, and these feed-rollers are normally pressed toward each other with a yielding pressure, so as to allow for the irregular shapes of blanks or articles, and are always maintained in symmetrical positions, so as to center the blank or article fed therethrough, by means of the levers $d\,d$, $d'\,d'$, and $d^2\,d^2$, said levers being pivoted in the standards $c$, $c'$, and $c^2$, respectively, and the upper and lower levers of each set being coupled together, as by the link $e$ in the first set, $e'$ in the second set, and $e^2$ in the third set, and the upper and lower levers of each set acting in opposite directions, as shown upon the bearing-boxes and feed-rollers carried thereby, the yielding pressure being afforded by weights (not shown) depending from the levers $f$, $f'$, and $f^2$, respectively.

It is of course evident that the construction of the feed-rollers and connecting parts may be varied to a considerable extent and that springs may be employed instead of weights to afford the yielding pressure desired. The arrangement of these pairs of feeding-rollers is such that the pairs $b$ and $b'$ guide the blank or partly-finished article until it has entered and is firmly held by the guide devices in the head-stock of the machine, to be hereinafter described, while the rollers $b'$ continue to hold and guide the blank or article until it has entered between the pair of rollers $b^2$. The guide devices within the head-stock of the machine are shown as consisting of the four guide-rollers $g$, each mounted on an arm pivoted upon the sleeve $g'$, which is tightly held in the bore of the head-stock $h$, and these rollers $g$ are each normally pressed inward by a spring, as shown, and these rollers $g$ are each provided with a V groove and so arranged as to hold and center the blank or article at points corresponding to the four corners of a square. It is of course evident that springs may be substituted for these spring-actuated rollers in some constructions and that other forms of guides may be used to hold the articles in proper central position.

The tool-head $j$ is fitted to rotate upon a suitable tubular bearing formed on or extending from the head-stock $h$ of the machine. This tool-head is not shown in Figs. 1 to 7, inclusive, as having its bearing directly upon the head-stock $h$, but is so shown in Figs. 8 and 9. In Figs. 1 to 7 a rotating driving-pulley $i$ is mounted directly upon the head-stock and has a bearing-sleeve which intervenes between the tool-head bearing-sleeve and the tubular extension of the head-stock $h$. The tool-head $j$ is provided with a face-plate $j'$, provided with radial grooves within which are fitted bearing-boxes $j^2$, carrying rotating tool-shafts $j^3$, and these tool-shafts $j^3$ are also provided with bearings (shown as spherical or universal bearings) in lugs $j^4$, extending outward from the tool-head. The tools are carried upon the tool-shafts $j^3$ and may consist of grinders or polishers $j^8$, as shown in Figs. 1 to 4, or other forms of finishing-tools or of cutting-tools, as shown in Figs. 8 and 9, and consisting of the clamps $j^5$ and the chisels or cutters $j^6$, held therein, or other forms of cutting-tools may be used; and these parts are interchangeable, so that a machine may be provided with the cutting-tools to perform the preliminary operation of cutting the articles from the blank, and then the cutting-tools may be removed and grinding wheels or tools inserted, and the partly-finished blank that has been subjected to the cutting operation may be again put through the machine to have its surface ground, and again a set of polishing-tools may be inserted in the machine and the article again put through the machine and polished and finished; or this work may be effected with much greater economy of time by having in the factory one of my improved machines fitted up as a cutter, another as a grinder, and another as a polisher, and, of course, if other operations are desirable in finishing the tools—such as varnishing—rotating brushes may form the tools of the machine to perform this work; or if it is desired to duplicate any of these operations the required number of machines may be fitted up. It is evident the number of tool-carrying shafts $j^3$ and tools carried thereby may be one or three or any desired number instead of two, as shown.

In the construction shown in Figs. 1 to 7, inclusive, the tools and tool-shafts are caused to rotate upon their axes by means of pinions $j^7$, mounted upon the tool-shafts $j^3$ and gearing with internal teeth formed upon the driving-pulley $i$. (See Fig. 7.) These pinions $j^7$ are arranged quite close to the universal bearings of the tool-shafts in the lugs $j^4$ of the tool-head, so that the movement of the tools to and from the axes of revolution causes comparatively slight movements of the pinions $j^7$, and the pinions always mesh with the internal teeth. It is usually desirable to attain an extremely high rotative speed in the tools, and this may be accomplished by imparting a proportional speed to the driving-pulley $i$, and it will be noted that the only parts that will be subjected to this high speed will be the driving-pulley $i$ and the tools and tool-shafts.

In the construction shown in Figs. 8 and 9 the internal teeth are formed upon a fixed part of the machine, which is the extension $h^2$ from the head-stock $h$. This construction permits a high rotative speed to be attained in the tools and is exceedingly simple, but it is not usually as desirable for very high speeds and heavy work as that shown in Figs. 1 to 7, inclusive.

In the construction shown in Figs. 8 and 9 the tool-head $j$ is rotated by the driving-pulley $i'$, which is formed upon or secured to the tool-head and forms a part thereof, and the rotative speed of the tools has a fixed relation to the speed at which they are revolved about the blanks or articles, whereas in the construction shown in Figs. 1 to 7, inclusive, the speed at which the tools are revolved about the article may be adjusted at pleasure and altogether independently of the speed at which the tools are rotated upon their axes as they are caused to revolve about the article.

The tool-head in the construction shown in Figs. 1 to 7, inclusive, is rotated by means of a gear-wheel $j^9$, which meshes into gear-teeth formed upon the outer periphery of the face-plate $j'$, and this gear-wheel $j^9$ is mounted upon the main driving-shaft $k$ of the machine.

The preferred construction of the means for guiding the tools so as to cause them to approach toward and recede from the axis of revolution in accordance with the irregular contour desired to be produced in the article is shown in Figs. 8 and 9, and consists of a guide $l$, fitted to slide longitudinally by means of rods $l'$ $l'$, passing through bearings in the head-stock $h'$ $h^2$, and the inner periphery of this guide is peculiarly shaped, so as to properly control the movement of the tools. A suitable rounded projection-stud or contact-point $l^2$ extends from each bearing-box $j^2$ of the tool-shafts $j^3$ and comes in contact with the peculiarly-shaped inner periphery of the guide $l$. Springs $l^3$ press these shafts and the contact-point $l^2$ outward, and thus hold the contact-points against the inner periphery of the guide $l$. The rods $l'$ $l'$ are joined by a cross-piece $l^4$, which is longitudinally adjustable thereon and has a projecting stud or point $l^5$, and this stud or point $l^5$ works against the outer periphery of the cam $l^6$ and is held against the same with a yielding pressure by the spring $l^{14}$, and this cam $l^6$ is caused to rotate in the direction indicated by the arrow, and is so shaped as to gradually move forward the cross-piece $l^4$, rods $l'$ $l'$, and guide $l$ during an operation slightly less than one revolution, and at the conclusion of one revolution to return said frame, rods, and guide to their starting position. Thus one revolution of the cam $l^6$ causes the guide $l$ to gradually move toward the right or front of the machine, and thereby causes different portions of the inner periphery of said guide $l$ to come in contact with the points $l^2$ and control the movements of said points. The guide, cam, and other parts are shown in about middle positions in Fig. 8, as they would be when one-half the length of the blank or article had been subjected to the action of the tools. Upon a comparison of the shape of the hammer-handle, part of which is shown by the dotted lines $x$ in Fig. 8 and the full length of which is shown by similar lines in Fig. 5, it will be seen that the longitudinal section of the guide $l$ is of a contour corresponding to the longitudinal contour of the hammer-handle, except that it is foreshortened in length, so that the contact-points $l^2$ as the guide $l$ is caused to move in contact with them will guide the tools in correspondence with the longitudinal contour desired to be produced in the handle. The cross-contour at any point may be governed by the shape of the cross-section of the guide $l$ at the corresponding point thereof. Where an elliptical cross-contour is desired, the cross-section of the guide will have the corresponding variations of distance from the axis of revolution of the tools that are necessary to guide the tools and cause them to produce the elliptical contour of the article, and where another contour is desired it is only necessary to properly shape the internal periphery of the guide $l$ at the proper location to produce said contour in the article. Thus any desired graceful shape may be imparted to the article within a very wide range of variations. It will be noted that as the guiding-surface is of very much larger diameter than the article operated upon, and the variations in radial dimensions in the cross-contour of the article are produced by variations of corresponding or less magnitude in the guiding-surface, these variations in the radial dimensions of the guiding-surface are very much smaller relatively to the very much larger radius and periphery of the guide, and therefore irregularities in the cross-contour of the article would be produced by a contour of the guiding-surface much more regular than the contour of the article. It is of course evident that variations of the contour of the article may also be produced by altering the movement of the cam, and thus causing the points $l^2$ to dwell upon certain portions of the inner periphery of the guide $l$ and to move rapidly over other portions, so that by changing the form of the cam and changing the longitudinal and cross contour of the internal surface of the guide $l$ a very large number of variations in the contour to be produced may be effected.

In Figs. 1 to 7, inclusive, I have shown a form of guide $l^7$ which is well adapted for use when the article to be produced is to have the same shape of cross-contour wherever it has the same dimensions and where all cross-contours are to be similar figures—as, for instance, where the cross-contours are to be ellipses having the same ratio of major axis to minor axis. An inclined surface $l^8$ is formed on the outer part of each bearing-box $j^2$ of the tool-shafts, and this works against the conical inner periphery of the guide $l^7$, and the cross-section of this inner periphery of the guide $l^7$ is so shaped as to guide the tools toward and away from the axis of revolution, so as to produce the desired cross-contour (shown as elliptical, see Fig. 6) in the article operated upon, while means are provided for moving the guide $l^7$ longitudinally, so as to vary the diameter of the cross-contour by the engagement of the inclined faces $l^8$ with the conical inner periphery of the guide $l^7$. The guide $l^7$ has secured to it rods $l^{16}$, which are fitted to slide longitudinally in guides $l^9$, and are joined at or near their rear ends by the cross-piece $l^{10}$, which is longitudinally adjustable thereon, and this cross-piece $l^{10}$ has a projection or point $l^{11}$, which works against the face of the cam $l^{12}$, and is held with a yielding pressure against said cam by the springs $l^{13}$ on the rods $l^{16}$, or may be held by other yielding devices. The cam $l^{12}$ is of the proper form to cause the desired longitudinal movements of the guide $l^7$ for the production of the hammer-handle shown by the dotted lines $x$. Suitable variations in the shape of this cam will produce other articles in which the variations of the dimension of the cross-contour are differently arranged and of different degree, while the substitution of another guide $l^7$, having an inner periphery of different shape, will result in the production of cross-contours of different shapes.

The cam $l^{12}$ is shown as removably held by bolts upon the hub $l^{15}$, which hub is fitted to rotate in the standard $l^{16}$, extending upward from the bed-plate $a$, and this cam receives its motion from the cross-shaft $k'$, fitted in bearings in the lower part of the bed $a$ and geared by a worm and worm-wheel $k^2$ $k^3$ to the main driving-shaft $k$, a gear $k^4$ at one end of said cross-shaft $k'$ meshing into an intermediate gear $k^5$, which, in its turn, meshes into the gear $k^6$, mounted upon the shaft $k^7$, upon which shaft $k^7$ the hub $l^{15}$ of the cam $l^{12}$ is fitted to rotate freely, so that the cam is not operated by the rotation of said shaft $k^7$, except when it is coupled to said shaft, and a suitable clutch mechanism is shown which automatically couples and uncouples the cam-hub $l^{15}$ and shaft $k^7$. This clutch mechanism consists of the sliding clutch $k^8$, fitted to rotate with the shaft $k^7$, but free to move longitudinally thereon, and having suitable engaging-faces which mesh with counterpart faces on the hub $l^{15}$ of the cam $l^{12}$. An annular groove is formed in the hub of the clutch $k^8$, in which works a pivoted yoke $m'$, mounted upon the shaft $m$, and this shaft $m$ is fitted to oscillate in suitable small bearing blocks or lugs extending upward from or secured to the bed-plate $a$, (and for greater clearness in showing the construction is, with its connecting mechanism, partly shown in Fig. 5,) and has at its front end an arm $m^2$, which works into and is controlled by the vertically-sliding finger $m^3$, which is arranged just in front of the tools and is normally pressed upward by the spring $m^4$ and slides in bearings in the bed-plate $a$ and in the standard $m^5$. This finger $m^3$ is so interposed in the path of the blank or article that is fed forward by the feed-rollers $b$ $b'$ that said blank or article depresses said finger $m^3$ just before it enters under the action of the tools, and this depression of the finger $m^3$, acting through the arm $m^2$, causes the shaft $m$ to oscillate, and, through the yoke $m'$, throws the clutch $k^8$ into engagement with the hub $l^{15}$, and thus starts the rotation of the cam $l^{12}$. The finger $m^3$ is maintained in its depressed position and the cam is thus coupled with its shaft until the end of the blank or article has passed by the finger $m^3$, at which point, of course, the cycle of operations upon this article will have been nearly or quite completed. As soon as the blank or article has passed beyond the finger $m^3$, it is pushed upward by its spring $m^4$, and the cam $l^{12}$ is thus uncoupled from its shaft $k^8$ and brought to rest, and the mechanism is so arranged that the movement of the cam will cease at the completion of one revolution thereof. The cam $k^{12}$ remains at rest until another blank or article is fed forward into position to depress the finger $m^3$. The relationship of the movement of the feeding mechanism and of the shaft $k^7$ is such that during the feeding forward of one of the blanks or articles the shaft $k^7$ will, as aforesaid, perform one revolution, and after the conclusion of the cycle and at the point where the cam $l^{12}$ is uncoupled with its shaft and brought to a standstill it will have performed one full revolution, and will therefore be in the position from which it started at the beginning of said cycle of operations. Thus the machine automatically repeats the same cycle of operations upon each blank or article that is fed through it. It is of course evident that this arrangement may be varied in accordance with the shape of the article, and means are provided for varying the relative speeds of the shaft $k^7$ and shaft $k'$, such means consisting of the intermediate gear $k^5$, above referred to, which is held at a fixed distance from the gear $k^6$ and its shaft $k^7$ by the pivoted arm $k^{10}$, while its distance from the shaft $k'$ is adjustable by means of the slotted arm $k^9$ to provide for gears of different dimensions upon said shaft $k'$.

The driving mechanism for the feeding-rollers is shown as comprising two sprocket-chains $n$ and $n'$, both of which pass over the double sprocket-wheel $n^2$, which is connected to said cross-shaft $k'$ by a gear $n^3$, meshing with the gear $n^4$, secured upon the cross-shaft $k'$, and these sprocket-chains $n$ and $n'$ alternately operate the upper and lower rollers of the sets of feeding-rollers in the manner clearly indicated in Fig. 1—that is to say, the chain $n$ actuates the lower feed-roller $b^2$, the upper feed-roller $b'$, and the lower feed-roller $b$, and then passes over the double idler sprocket-wheel $n^6$ and back again to the double sprocket $n^2$, while the chain $n'$ actuates the upper feed-roller $b^2$, the lower feed-roller $b'$, and the upper feed-roller $b$, and also passes over the idler sprocket $n^6$ and back again to the double sprocket $n^2$. It is of course evident that other driving mechanism may be substituted in place of that shown herein, although the mechanism shown is well adapted for the machine.

The main driving-shaft $k$ receives its motion from the driving-pulley $k^{11}$, and by the arrangement of driving mechanism shown in Figs. 1 to 7, inclusive, the two driving-pulleys $k^{11}$ and $i$ have parallel axes, and may be driven from a single shaft or counter-shaft without twisting the belts. The driving-pulley $i$ causes the rotation of the tools upon their axes as they are revolved about the article by the mechanism operated by the driving-pulley $k^{11}$, while the other movements of the machine—that of feeding the blank or article and actuating the guide $l^7$—are performed by mechanism connected to and actuated by the guide-pulley $k^{11}$. In the modified construction shown in Figs. 8 and 9, the driving-pulley $i'$ causes both the revolution of the tools about the blank or article and the rotation of the tools upon their axes, while, of course, other mechanisms, substantially the same as that shown in the other figures, would be employed to feed the article and to actuate the cam $l^6$, and thus move the guide $l$.

It is of course evident that parts of my invention may be used separately or in connection with other parts of different construction, and that various modifications may be made in the construction without departing from my invention. I do not, therefore, limit my invention to the specific construction and arrangement above shown and described; but

What I claim, and desire to secure by Letters Patent, is—

1. In a lathe for irregular shapes, the combination with a tool and means for rotating said tool upon its axis, of means for revolving said tool in an orbit parallel to the desired cross contour of the article to be produced and for varying the orbit of motion of the rotating tool in accordance with the desired contour of the article, as the tool operates at different points along the length of said article, substantially as set forth.

2. In a lathe for irregular shapes, the combination with a tool, of means for revolving said tool in an orbit parallel to the desired cross contour of the article and varying the shape of said orbit as the tool operates at different points along the length of said article, substantially as set forth.

3. In a lathe for irregular shapes, the combination with a tool, of means for revolving said tool about the article, and a peripherally varying guide controlling the orbit of movement of said tool, said guide being of different shape at different portions of its length, and means for causing relative longitudinal movements of said guide, substantially as set forth.

4. In a lathe for irregular shapes, the combination with a tool and means for rotating the same upon its axis, of means for revolving said tool about the article in an orbit parallel to the cross contour desired to be produced and varying the shape of said orbit as the tool operates at different points along the length of the article, substantially as set forth.

5. In a lathe for irregular shapes, the combination with a tool and means for rotating the same upon its axis, of means for revolving said tool about the article, and a peripherally varying guide controlling the orbit of movement of said tool, said guide being of different shape and different dimensions at different portions of its length, and means for causing relative longitudinal movements of said guide, substantially as set forth.

6. In a lathe for irregular shapes, the combination with a tool and means for revolving the same about the article, of a guide controlling the orbit of revolution of said tool, said guide having sections of different shape so as to vary the orbit of revolution of said tool at different points along the length of said article, substantially as set forth.

7. In a lathe for irregular shapes, the combination with a tool and means for revolving the same about the article, of a guide controlling the orbit of revolution of said tool, said guide having sections of different shape and of different dimensions so as to vary the shape and dimensions of the orbit of revolution of said tool at different points along the length of said article, substantially as set forth.

8. In a lathe for irregular shapes, the combination with a rotating tool head and one or more tools carried thereby and mechanism for feeding the blank or article through said tool head, of means for rotating said tools upon their axes as they are caused to revolve about the article, and a guide controlling the movement of said tools in accordance with the desired irregular contour of the article, substantially as set forth.

9. In a lathe for irregular shapes, the combination with a rotating tool head and one or more tool shafts fitted to rotate therein and one or more tools carried thereby, the bearings of said shafts being so constructed as to permit the tools to approach to and recede from the axis of revolution, and mechanism for feeding the blank or article through said tool head, and gears upon said tool shafts and a driving gear with which said gears of the tool shafts are held in engagement in their revolution about the article, and means for rotating said driving gear independently of the rotation of the tool head, and a guide controlling the movement of said tools and means for operating said guide so that it will actuate the tools in accordance with the desired irregular contour of the article, substantially as set forth.

10. In a lathe for irregular shapes, the combination with a rotating tool head and one or more tool shafts carried thereby, and tools upon said shafts and means for rotating said tool shafts, and mechanism for feeding the blank or article through said tool head, of a guide having its contour varied in accordance with the contour desired in the article, and one or more contact devices connected to said tools, and means for moving said guide so as to bring said contact devices into contact with different portions of said guide according to the desired contour of the article, substantially as set forth.

11. In a lathe for irregular shapes, the combination of a rotating tool head, one or more tool shafts held at one end in a bearing having a fixed position on said tool head and at the other end by a bearing fitted to slide in said tool head and one or more tools carried by said tool shafts, said bearings permitting said tools to move toward and from the axis of revolution, means for rotating said tool shafts and tools upon their axes, and a guide controlling the movement of the tools and tool shafts to and from the axis of revolution in accordance with the desired irregular contour of the article, substantially as set forth.

12. In a lathe for irregular shapes, the combination of a rotating tool head, one or more tool shafts held in bearings thereon, and one or more tools carried thereon, said tool shaft bearings being so constructed as to permit the tools to move toward and from the axis of revolution, means for rotating said tool shafts independently of the rotation of the tool head, and a guide controlling the movement of said tools and tool shafts to and from the axis of revolution, and having its contour varied in accordance with the contour desired in the article, and means for moving said guide so as to bring different portions of its surface into operation upon said tools in accordance with the desired irregular contour of the article, and means for feeding the article under the action of said tools, substantially as set forth.

13. In a lathe for irregular shapes, the combination with a rotating tool head and one or more tools carried thereby, and a non-rotary head stock carrying said tool head and having a tubular opening therethrough, of spring guides held in said head stock and adapted to center and guide the article as it passes through the bore of the head stock, and a suitable feeding mechanism adapted to co-operate with said spring guides in feeding the article under the action of said tools, substantially as set forth.

14. In a lathe for irregular shapes, the combination with a rotating tool head and one or more tools carried thereby, and a non-rotary head stock carrying said tool head and having a tubular opening therethrough, of spring guides held in said head stock and adapted to center and guide the article as it passes through the bore of the head stock, and the sets of feed rollers $b$, $b'$, and $b^2$, both of said sets of feed rollers $b$ and $b'$ being adapted to guide the article under the action of the tools until the article is guided at one end by said spring guides, and the set of feed rollers $b'$ continuing to guide said article until the article enters the feed rollers $b^2$, whereby the article is at all times guided at two points along its length when under the action of the tools, substantially as set forth.

15. In a lathe for irregular shapes, the combination with a rotating tool head and one or more tools carried thereby, and a guide controlling the movement to and from the axis of revolution of said tools, and actuating mechanism for said guide, of feeding mechanism for the blank or article, and means operated by said blank or article for starting and stopping said guide actuating mechanism, substantially as set forth.

16. In a lathe for irregular shapes, the combination with a rotating tool head and one or more tools carried thereby, and a movable guide controlling the movement to and from the axis of revolution of said tools, and actuating mechanism for said guide, of means for feeding a blank or article under the operation of said tools, and a yielding finger interposed in the path of said blank or article, and a mechanism actuated by said finger for stopping and starting the guide actuating mechanism, substantially as set forth.

17. In a lathe for irregular shapes, the combination with a rotating tool head and one or more tools carried thereby, and a movable guide controlling the movement of said tools to and from the axis of revolution in accordance with the desired irregular shape of the article, of means for feeding a blank or article under the operation of said tools, and a yielding finger interposed in the path of said blank or article, an oscillating shaft connected to or engaging with said finger and a clutch mechanism connected to or engaging with said oscillating shaft, and a driving shaft and mechanism operating said guide for the tools, between which driving shaft and guide operating mechanism the said clutch is interposed, substantially as set forth.

18. In combination, a rotating tool head and one or more tools carried thereby, a movable guide controlling the movement of said tools to and from the axis of revolution in accordance with the desired shape of the article, means for feeding the blank or article under the operation of said tools, the yielding finger $m^3$ interposed in the path of said blank or article, the shaft $m$ and arm $m^2$ engaging with said finger $m^3$, the yoke $m'$ on said shaft $m$, a driving shaft, a cam mounted so as to rotate independently of said driving shaft, a clutch adapted to connect said shaft and cam and engaged by said yoke $m'$, and a contact device bearing against said cam and connected to said guide, substantially as set forth.

19. In combination, a head stock having a tubular bore, a driving pulley fitted to rotate thereon, and having an internal gearing surface formed thereon, a tool head fitted to rotate around said head stock and one or more tool shafts and tools carried thereby, said tool shafts being provided with pinions meshing into said internal gearing surface of the driving pulley, the bearings for said tool shafts being constructed so as to permit said tools to rotate upon their axes and to move toward and from the axis of revolution, and said tool head having a face plate provided with a gearing surface, a gear meshing into said gearing surface of the face plate and means for actuating said gear, and means for controlling the movement toward and from the axis of revolution of said tools, substantially as set forth.

20. In combination, the head stock $h$ having a tubular bore, the driving pulley $i$ fitted to rotate thereon and having an internal gearing surface, the tool head $j$ having a face plate $j'$ and fitted to rotate upon the sleeve of said driving pulley $i$, one or more tool shafts $j^8$ fitted to rotate on their axes in said tool head and held at or near one end by a bearing having a fixed position but permitting angular movement of the shaft and at or near the other end by a bearing fitted to slide in a slot in the face plate $j'$ of said tool head, pinions $j^7$ on said tool shafts meshing with said internal gearing surface of the pulley $i$, a gear meshing into a gearing surface formed upon the face plate $j'$ and means for actuating said gear, a movable guide surrounding said tool shafts and a contact point for each of said tool shafts working against the face of said guide, and means for actuating said guide, and a feeding mechanism for the blank or article, the actuating mechanism of which is connected to said guide actuating and gear actuating mechanisms, substantially as set forth.

This specification signed and witnessed this 18th day of April, 1894.

HENRY W. N. COLE.

In presence of—
    HENRY D. WILLIAMS,
    EDITH J. GRISWOLD.